(12) United States Patent
Defosse

(10) Patent No.: US 7,171,451 B2
(45) Date of Patent: *Jan. 30, 2007

(54) REMOTE DATA ACQUISITION AND TRANSMISSION SYSTEM AND METHOD

(75) Inventor: Erin M. Defosse, Austin, TX (US)

(73) Assignee: Isochron, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/208,221

(22) Filed: Jul. 30, 2002

(65) Prior Publication Data

US 2002/0194387 A1    Dec. 19, 2002

Related U.S. Application Data

(63) Continuation of application No. 09/267,254, filed on Mar. 12, 1999, now Pat. No. 6,457,038.

(60) Provisional application No. 60/099,434, filed on Sep. 8, 1998, provisional application No. 60/078,645, filed on Mar. 19, 1998.

(51) Int. Cl.
    *G06F 15/16*    (2006.01)

(52) U.S. Cl. ............... 709/208; 709/250; 700/231

(58) Field of Classification Search ............ 709/208, 709/250, 253; 705/23, 63; 700/231; 706/244
See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | 340/825.35 |
| 4,412,292 A | 10/1983 | Sedam et al. | 364/479 |
| 4,454,670 A | 6/1984 | Bachmann et al. | 40/584 |
| 4,661,862 A | 4/1987 | Thompson | 358/335 |
| 4,677,565 A | 6/1987 | Ogaki et al. | 364/479 |
| 4,766,548 A | 8/1988 | Cedrone et al. | 364/479 |
| 4,850,009 A | 7/1989 | Zook et al. | 379/96 |
| 4,926,996 A | 5/1990 | Eglise et al. | 194/212 |
| 4,954,697 A | 9/1990 | Kokubun et al. | 235/381 |
| 5,029,098 A | 7/1991 | Levasseur | 364/479 |
| 5,077,582 A | 12/1991 | Kravette et al. | 355/206 |

(Continued)

FOREIGN PATENT DOCUMENTS

DE    41 40 450 A1    6/1993

(Continued)

OTHER PUBLICATIONS

Left high and dry? Sold-out machine sends for Cokes; Nashville Banner, Wednesday, Aug. 16, 1995.

(Continued)

*Primary Examiner*—Andrew Caldwell
*Assistant Examiner*—Stephan Willett
(74) *Attorney, Agent, or Firm*—Baker Botts L.L.P.

(57) ABSTRACT

A remote data acquisition and transmission system and method are disclosed. A plurality of application controllers are interfaced with remote equipment from which operation data is acquired by the application controllers. The application controllers communicate with an application host via a local area network, and the application host can communicate with a network operations center using a wide area network interface. In one embodiment, each application controller interfaces with remote equipment that comprises a vending machine.

18 Claims, 6 Drawing Sheets

U.S. PATENT DOCUMENTS

| | | | |
|---|---|---|---|
| 5,090,589 A | 2/1992 | Brandes et al. .................. 221/2 |
| 5,091,713 A | 2/1992 | Horne et al. ................. 340/541 |
| 5,117,407 A | 5/1992 | Vogel ........................... 369/30 |
| 5,184,179 A | 2/1993 | Tarr et al. .................... 355/206 |
| 5,207,784 A | 5/1993 | Schwartzendruber .......... 221/6 |
| 5,239,480 A | 8/1993 | Huegel ....................... 364/479 |
| 5,255,819 A | 10/1993 | Peckels ......................... 222/1 |
| 5,282,127 A | 1/1994 | Mii .............................. 364/479 |
| 5,323,155 A | 6/1994 | Iyer et al. ..................... 341/51 |
| 5,337,253 A | 8/1994 | Berkovsky et al. .......... 364/479 |
| 5,339,250 A | 8/1994 | Durbin ....................... 364/479 |
| 5,371,348 A | 12/1994 | Kumar et al. ............... 235/472 |
| 5,386,360 A | 1/1995 | Wilson et al. ............... 364/146 |
| 5,400,246 A | 3/1995 | Wilson et al. ............... 364/146 |
| 5,418,945 A | 5/1995 | Carter et al. ................ 395/600 |
| 5,445,295 A | 8/1995 | Brown ........................... 221/3 |
| 5,505,349 A | 4/1996 | Peckels ....................... 222/641 |
| 5,507,411 A | 4/1996 | Peckels ......................... 222/1 |
| 5,561,604 A | 10/1996 | Buckley et al. ........ 364/479.05 |
| 5,608,643 A | 3/1997 | Wichter et al. ........ 364/479.14 |
| 5,620,079 A | 4/1997 | Molbak ....................... 194/217 |
| 5,649,308 A | 7/1997 | Andrews .................... 370/334 |
| 5,671,362 A * | 9/1997 | Cowe et al. .................. 705/28 |
| 5,701,252 A | 12/1997 | Facchin et al. ............. 364/479 |
| 5,708,223 A | 1/1998 | Wyss ......................... 73/865.9 |
| 5,769,269 A | 6/1998 | Peters ............................ 221/7 |
| 5,787,149 A | 7/1998 | Yousefi et al. ................. 379/59 |
| 5,794,144 A * | 8/1998 | Comer et al. ............. 455/426.1 |
| 5,805,997 A | 9/1998 | Farris |
| 5,815,652 A | 9/1998 | Ote et al. ................ 395/183.07 |
| 5,818,603 A | 10/1998 | Motoyama .................. 358/296 |
| 5,822,216 A | 10/1998 | Satchell, Jr. et al. .... 364/479.01 |
| 5,841,866 A | 11/1998 | Bruwer et al. ................ 380/23 |
| 5,842,597 A | 12/1998 | Kraus et al. ............. 221/150 R |
| 5,844,808 A | 12/1998 | Konsmo et al. ........ 364/479.14 |
| 5,850,187 A | 12/1998 | Carrender et al. ..... 340/825.54 |
| 5,860,362 A | 1/1999 | Smith .......................... 101/494 |
| 5,862,517 A | 1/1999 | Honey et al. |
| 5,867,688 A | 2/1999 | Simmon et al. ............ 395/500 |
| 5,892,758 A | 4/1999 | Argyroudis |
| 5,898,904 A | 4/1999 | Wang ......................... 455/31.3 |
| 5,905,442 A | 5/1999 | Mosebrook et al. |
| 5,905,882 A | 5/1999 | Sakagami et al. |
| 5,907,491 A | 5/1999 | Canada et al. ......... 364/468.15 |
| 5,909,183 A | 6/1999 | Borgstahl et al. ...... 340/825.22 |
| 5,915,207 A | 6/1999 | Dao et al. ....................... 455/9 |
| 5,918,213 A | 6/1999 | Bernard et al. ............... 705/26 |
| 5,924,081 A | 7/1999 | Ostendorf et al. ............ 705/30 |
| 5,930,770 A | 7/1999 | Edgar ........................... 705/28 |
| 5,930,771 A | 7/1999 | Stapp .......................... 705/28 |
| 5,941,363 A | 8/1999 | Partyka et al. .............. 194/217 |
| 5,943,042 A | 8/1999 | Siio ............................. 345/172 |
| 5,949,779 A | 9/1999 | Mostafa et al. |
| 5,950,630 A | 9/1999 | Portwood et al. ........... 128/897 |
| 5,956,487 A | 9/1999 | Venkatraman et al. |
| 5,957,262 A | 9/1999 | Molbak et al. ............. 194/200 |
| 5,959,536 A | 9/1999 | Chambers et al. |
| 5,959,869 A | 9/1999 | Miller et al. ............... 364/479.1 |
| 5,979,757 A | 11/1999 | Tracy et al. ................ 235/383 |
| 5,982,325 A | 11/1999 | Thornton et al. ....... 342/357.07 |
| 5,982,652 A | 11/1999 | Simonelli et al. ........... 363/142 |
| 5,986,219 A | 11/1999 | Carroll et al. ................. 177/1 |
| 5,991,749 A | 11/1999 | Morrill, Jr. .................. 705/44 |
| 5,997,170 A | 12/1999 | Brodbeck ............. 364/479.06 |
| 6,003,070 A | 12/1999 | Frantz |
| 6,005,850 A | 12/1999 | Moura et al. ............... 370/282 |
| 6,012,041 A | 1/2000 | Brewer et al. ................ 705/28 |
| 6,021,324 A | 2/2000 | Sizer, II et al. |
| 6,021,437 A | 2/2000 | Chen et al. ................. 709/224 |
| 6,029,143 A | 2/2000 | Mosher et al. ............... 705/28 |
| 6,032,202 A | 2/2000 | Lea et al. |
| 6,038,491 A | 3/2000 | McGarry et al. ........... 700/231 |
| 6,052,667 A | 4/2000 | Walker et al. ................ 705/15 |
| 6,052,750 A | 4/2000 | Lea .............................. 710/72 |
| 6,056,194 A | 5/2000 | Kolls .......................... 235/381 |
| 6,057,758 A | 5/2000 | Dempsey et al. ........... 340/539 |
| 6,061,668 A | 5/2000 | Sharrow ..................... 705/400 |
| 6,070,070 A * | 5/2000 | Ladue ......................... 455/419 |
| 6,072,521 A | 6/2000 | Harrison et al. .............. 348/12 |
| 6,084,528 A | 7/2000 | Beach et al. ........... 340/825.35 |
| 6,085,888 A | 7/2000 | Tedesco et al. ............. 194/217 |
| 6,119,100 A | 9/2000 | Walker et al. ................ 705/20 |
| 6,124,800 A | 9/2000 | Beard et al. ........... 340/825.35 |
| 6,131,399 A * | 10/2000 | Hall ............................. 62/127 |
| 6,161,059 A | 12/2000 | Tedesco et al. ............. 700/232 |
| 6,163,811 A | 12/2000 | Porter ......................... 709/247 |
| 6,181,981 B1 | 1/2001 | Varga et al. ................ 700/236 |
| 6,199,753 B1 | 3/2001 | Tracy et al. ................ 235/375 |
| 6,230,150 B1 * | 5/2001 | Walker et al. .............. 705/400 |
| 6,272,395 B1 | 8/2001 | Brodbeck .................... 700/236 |
| 6,324,520 B1 * | 11/2001 | Walker et al. ................ 705/16 |
| 6,338,149 B1 | 1/2002 | Ciccone, Jr. et al. ......... 714/38 |
| 6,341,271 B1 * | 1/2002 | Salvo et al. .................. 705/28 |
| 6,385,772 B1 | 5/2002 | Courtney .................... 725/105 |
| 6,434,534 B1 | 8/2002 | Walker et al. ................ 705/14 |
| 6,462,644 B1 | 10/2002 | Howell et al. .............. 340/5.92 |
| 6,525,644 B1 | 2/2003 | Stillwagon ................. 340/5.61 |
| 6,547,038 B1 * | 4/2003 | Thomsen et al. ............ 184/6.8 |
| 6,550,672 B1 | 4/2003 | Tracy et al. ................ 235/383 |
| 6,584,309 B1 * | 6/2003 | Whigham ................. 455/414.1 |
| 6,604,086 B1 * | 8/2003 | Kolls ............................ 705/14 |
| 6,604,087 B1 * | 8/2003 | Kolls ............................ 705/14 |
| 6,606,602 B1 * | 8/2003 | Kolls ............................ 705/14 |
| 6,606,605 B1 | 8/2003 | Kolls ............................ 705/26 |
| 6,615,623 B1 | 9/2003 | Ormerod ....................... 70/224 |
| 6,695,166 B2 | 2/2004 | Long ............................ 221/14 |
| 6,735,630 B1 | 5/2004 | Gelvin et al. ............... 709/224 |
| 6,748,296 B2 * | 6/2004 | Banerjee et al. ............ 700/241 |
| 6,751,562 B1 | 6/2004 | Blackett et al. .............. 702/61 |
| 6,754,558 B2 | 6/2004 | Preston et al. .............. 700/236 |
| 6,772,048 B1 * | 8/2004 | Leibu et al. ................. 700/241 |
| 6,826,607 B1 | 11/2004 | Gelvin et al. ............... 709/224 |
| 6,832,251 B1 | 12/2004 | Gelvin et al. ............... 709/224 |
| 6,837,436 B2 | 1/2005 | Swartz et al. .......... 235/472.02 |
| 6,844,813 B2 | 1/2005 | Hardman .................. 340/539.1 |
| 6,850,252 B1 | 2/2005 | Hoffberg .................... 345/716 |
| 6,859,831 B1 | 2/2005 | Gelvin et al. ............... 709/224 |
| 6,867,685 B1 | 3/2005 | Stillwagon ................. 340/5.64 |
| 6,876,988 B2 | 4/2005 | Helsper et al. ............... 706/21 |
| 6,900,720 B2 | 5/2005 | Denison et al. .............. 340/5.9 |
| 6,959,265 B1 | 10/2005 | Candela et al. ............. 702/186 |
| 6,973,475 B2 | 12/2005 | Kenyon et al. ............. 709/203 |
| 2001/0002210 A1 | 5/2001 | Petite .......................... 379/155 |
| 2002/0024420 A1 | 2/2002 | Ayala et al. ................ 340/5.61 |
| 2002/0169539 A1 | 11/2002 | Menard et al. .............. 701/200 |
| 2003/0013482 A1 | 1/2003 | Brankovic ................... 455/553 |
| 2003/0128101 A1 | 7/2003 | Long .......................... 340/5.26 |
| 2004/0207509 A1 | 10/2004 | Mlynarczyk et al. ...... 340/5.23 |
| 2005/0161953 A1 | 7/2005 | Roatis et al. ................ 292/199 |
| 2005/0179544 A1 | 8/2005 | Sutton et al. ................ 340/543 |

FOREIGN PATENT DOCUMENTS

| | | |
|---|---|---|
| EP | 0 564 736 A1 | 10/1993 |
| EP | 0 602 787 A2 | 10/1993 |
| EP | 0 817 138 A1 | 1/1998 |
| EP | 0 999 529 | 5/2000 |
| EP | 1096408 | 5/2001 |
| FR | 2 744 545 | 2/1996 |
| FR | 2 755776 | 5/1998 |
| JP | 04253294 | 9/1992 |
| JP | 6296335 A2 | 10/1994 |
| JP | 9198172 A2 | 7/1997 |
| JP | 10105802 | 4/1998 |

| WO | WO 89/07807 | 8/1989 |
| WO | WO 95/04333 | 2/1995 |
| WO | WO 95/05609 | 2/1995 |
| WO | WO 97/09667 | 3/1997 |
| WO | WO 99/23620 | 11/1997 |
| WO | WO 98/45779 | 10/1998 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | 02/19281 | 3/2002 |

OTHER PUBLICATIONS

Coke machines signal when it's time for a refill; The Globe & Mail, Toronto, ON, Aug. 30, 1995.

Wireless Communications Forum; vol. III, No. 1, Apr., 1995, pp. 25-30.

Meet the Smart Coke Machine; The Sacramento Bee Business Technology; Wednesday, Aug. 30, 1995.

International Search Report for PCT/US99/05983 mailed Aug. 13, 1999.

PCT Search Report PCT/US01/16749 Mailed Dec. 20, 2001.

Skywire Provides Details of Wireless 'VenView' System; Vending Times, Sep., 1994.

Skywire allows vendor tracking of pop stock and sales details; RCR, vol. 14, No. 17, Sep. 4, 1995.

PCT Search Report PCT/US 01/41640.

International Search Report PCT/US 01/31381, Mailed Nov. 7, 2002.

Pending U.S. Appl. No. 09/853,366, entitled *Method and System for the Optimal Formatting, Reduction and Compression of DEX/UCS Data* filed May 11, 2001 by Defossé et al.

Pending U.S. Appl. No. 09/862,891, entitled *System and Apparatus for the Remote Monitoring and Control of a Computing Component*—Filed May 22, 2001 by Erin M. Defossé.

Pending U.S. Appl. No. 09/899,527, entitled *Real-Time Alert Mechanism for Monitoring and Controlling Field Assets Via Wireless and Internet Technologies* filed Jul. 5, 2001 by May et al.

Pending U.S. Appl. No. 09/923,046, entitled *System and Method for Monitoring and Control of Beverage Dispensing Equipment* filed Aug. 6, 2001 by Erin M. Defoss.

Pending U.S. Appl. No. 09/971,170, entitled *Remote Data Acquisition, Transmission and Analysis System Including Handheld Wireless Equipment* filed Oct. 4, 2001 by Defossé.

Pending U.S. Appl. No. 09/895,647, entitled *Method and System for Interfacing a Machine Controller and a Wireless Network* filed Jun. 29, 2001 by Defossé et al.

NetBotz Internet Arrticle, "Welcome to Netbotz" at internet <http:www.netbotz.com>, Printed May 10, 2000.

American Power Conversion Internet Article, "Lightning Advisor", at internet,<http://lightning.apcc.com>, Printed May 10, 2000.

American Products Internet Article, "Product Information", at internet, <http://www.apc.com>, Printed May 10, 2000.

International Preliminary Examination Report PCT/US01/31381; 4 pages.

International Search Report PCT/US 03/37776, Mailed May 17, 2004.

Maxim/Dallas, "What is an iButton?" at internet http://www.maxim-ic.com/products/ibutton/ibuttons/, 3 pages.

*BT redcare Telemetry Vending Interface Unit (VIU)*, Antronics Ltd Case Study, <http:www.antronic.co.uk/portfolio/viu>, 4 pgs.

\* cited by examiner

REMOTE DATA ACQUISITION AND TRANSMISSION SYSTEM AND METHOD

CROSS REFERENCE TO RELATED APPLICATIONS

This application is a continuation application of U.S. patent application Ser. No. 09/267,254 filed on Mar. 12, 1999 by Erin M. Defossé entitled "A Wide Area Network Operation's Center that Sends and Receives Data from Vending Machines", now U.S. Pat. No. 6,457,038; which claims priority to U.S. Provisional Patent Application Ser. No. 60/078,645, filed Mar. 19, 1998, and entitled "Remote Data Acquisition and Transmission System for the Monitoring and Control of Vending Machines" and U.S. Provisional Patent Application Ser. No. 60/099,434, filed Sep. 8, 1998, and entitled "Remote Data Acquisition and Transmission System."

TECHNICAL FIELD OF THE INVENTION

The present invention relates in general to the field of remote data acquisition. More particularly, the present invention relates to a remote data acquisition and transmission system and method and, specifically, such a system for monitoring and control of vending machines.

BACKGROUND OF THE INVENTION

Over the past decade, vending machine manufacturers have developed new and innovative vending equipment in response to market needs and vending operator demands. These innovations have been, for the most part, adopted by the beverage vending industry. This trend has been influenced by the accelerating rate of technological innovation in the electronic and electro-mechanical component industry. The availability of new technologies has given vending machine manufacturers the tools to address many of the requirements of vending operators. Advances in electronics are now enabling the use of computer controls and data acquisition systems directly inside the vending machine. Some of the latest vending machines now make it possible for vending machine operators to download sales, inventory, and machine health information on-site onto portable computers.

Although these computerized systems make it easier for operators to gather and analyze data, they generally do not provide the real time capabilities that are needed to make a major impact on their vending operations.

There currently exist some remote data capture systems in the vending industry. Examples of such systems include the systems disclosed in U.S. Pat. Nos. 5,608,643; 4,766,548 and 4,412,292. Most of the conventional systems make use of point-to-point data acquisition systems that use a wireless data transmission system to receive and send information from/to individual vending machines. Some of the systems use wire-line data transmission systems (e.g. telephone lines) instead of a wireless one. The wireless point-to-point systems are hampered by the relatively high cost of long-range wireless transceivers at each of the vending machines. Further, the systems that implement long-range wireless transceivers at each vending machine have a severe limitation in that they cannot be made to function properly in locations that do not have a clear RF path to the central base station outside the building, perhaps even miles away. For example, if a vending machine is located deep inside a building the ability to transmit/receive data to/from the outside of the building is hampered by the signal attenuation caused by the building's structure. On the other hand, the wire-line systems suffer from high infrastructure costs given that dedicated wire must be drawn to each vending machine in order to create the point-to-point data link. Establishing a wire-line system is often a difficult task and frequently limits the ability to move associated vending machines from one location to another location. Thus, these conventional remote data capture systems generally do not adequately fill the needs of vending machine operators.

SUMMARY OF THE INVENTION

In accordance with the present invention, a remote data acquisition and transmission system is disclosed that provides advantages over previously developed remote data acquisition systems. In one embodiment, the remote data acquisition and transmission system is for monitoring and control of vending machines. The remote data acquisition and transmission system allows vending machine operators to gather data from the field without having to manually retrieve the data from the vending equipment and to transmit data to the field such as price changes without having to visit each vending machine. This ability will generally lead directly to improved sales and lower operational costs by enhancing a manager's ability to direct operations and react quickly in order to correct problems.

According to one aspect of the present invention, the system comprises one or more application controllers and an application host. The application controller or controllers are interfaced with remote equipment from which operation data may be acquired and information transmitted thereto by each application controller. Each application controller communicates with an application host via a local area network, and the application host can communicate with a network operations center using a wide area network interface. The system may include a local area network (LAN) with one unit and its associated application host or multiple units and associated application hosts.

According to another aspect of the present invention, a remote data acquisition and transmission system is provided for vending machines. This system comprises a plurality of application controllers. Each application controller interfaces, via a serial interface to a vending machine controller, with a vending machine from which operation data is acquired by the application controller. The system may also comprise an application host that communicates with the application controllers via a local area network. The application host comprises a wide area network interface for communicating with a network operations center. The network operations center communicates with the application host via a wide area network to receive the operation data acquired by the application controllers and to manage outgoing messages and/or data. Further, the application controllers and the application host operate to autoconfigure the local area network upon initialization, and the application controllers operate as relays when necessary to establish communication between the application host and other application controllers. In addition, the network operation center maintains a database storing the operation data and providing secure third party access to the database.

According to a further aspect of the present invention, a method is provided for remote data acquisition and transmission. The method includes interfacing a plurality of application controllers with remote equipment from which operation data is acquired by the application controllers. The method further includes communicating between an application host and the application controllers via a local area network, and communicating between the application host and a network operations center using a wide area network interface. Technical advantages of this embodiment of the present invention include the use of local wire-line and/or local-area wireless transmissions to implement a local area network (LAN) between multiple vending machines. This provides a remote data acquisition system for vending machines that overcomes the limitations of current point-to-point systems by establishing a low-cost LAN that can then communicate externally using a long-range wireless or wire-line communication system. For example, a narrow-band PCS wireless link (e.g., wireless two-way paging network) can be used between a remote vending machine LAN and a network operations center to establish an efficient and low-cost wide area network (WAN) which connects remote LANs together to form a larger network.

Additional technical advantages should be readily apparent from the drawings and description.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1:
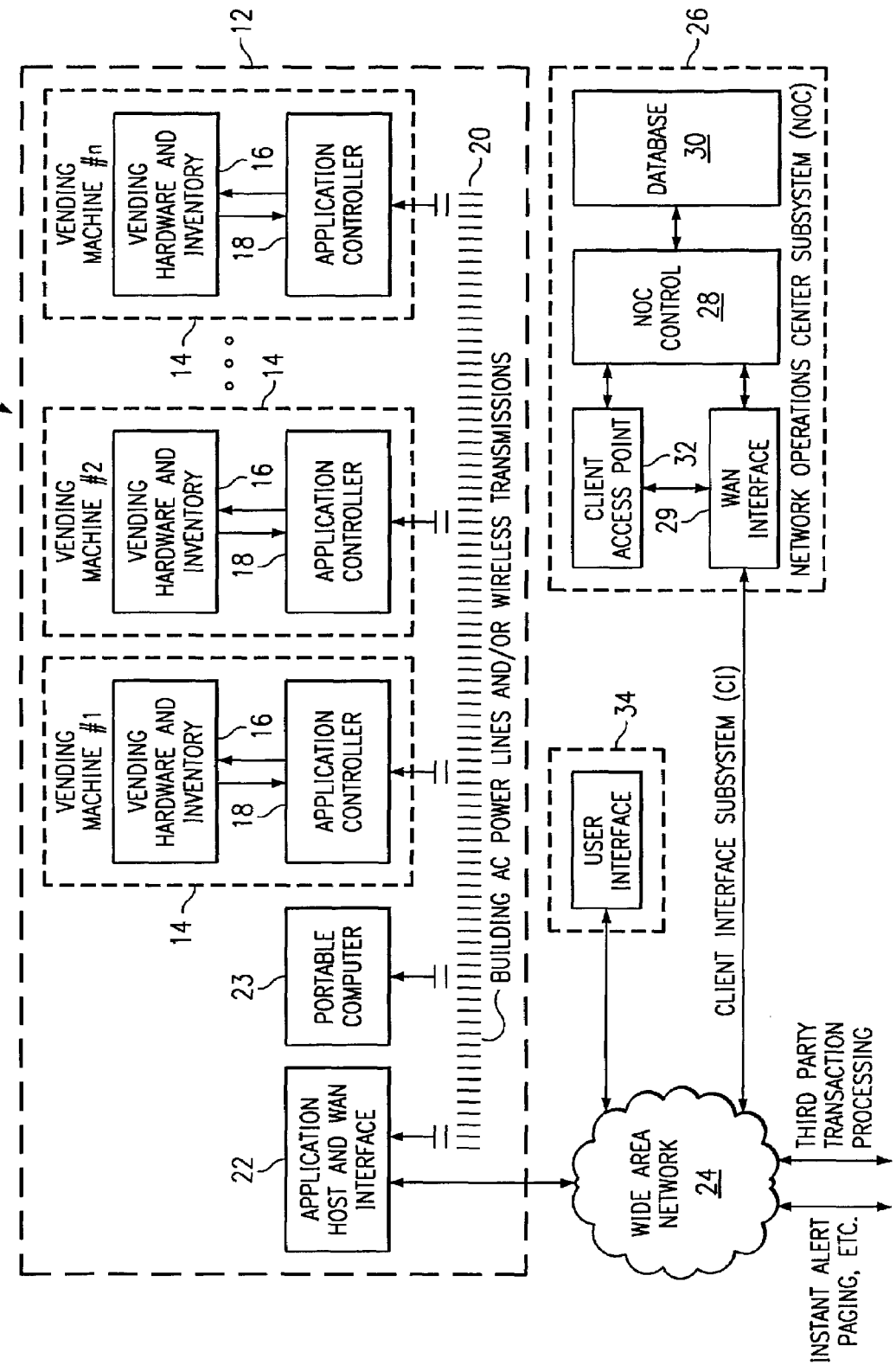
FIG. 1 is a functional block diagram of one embodiment of a remote data acquisition system for vending machines according to the present invention.

FIG. 1 is a functional block diagram of one embodiment of a remote data acquisition system for vending machines, indicated generally at 10, according to the present invention. In general, system 10 of FIG. 1 communicates information from a vending site 12 externally over a wide area wireless or wire-line network and internally over a local area wireless or wire-line network. As shown, the local area network at vending site 12 can be referred to as a vendor interrogation LAN subsystem (VIL). Vending site 12 may include only one vending machine 14 or a plurality of vending machines 14. Each vending machine 14 may include vending hardware and inventory 16 for performing vending functions and electronically tracking some vending information. Vending machines 14 may provide various types of products to customers such as soft drinks, snacks, etc.

According to the present invention, each vending machine 14 may include an application controller 18 coupled to and interfacing with vending hardware and inventory 16. Many vending machines 14 are equipped with electronics for controlling vending operations as well as tracking some vending events such as money received, change given and number of vends from each slot. Application controllers 18 can communicate with such embedded electronics as well as be equipped to directly sense other vending events and vending equipment parameters (e.g. compressor performance). Application controllers 18 can also communicate with one another and the application host 22 via onboard wire-line interfaces or wireless transceivers using wire-line or wireless transmissions respectively.

The term "wire-line transmissions" is used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present invention over electrical power lines, electrical power distribution systems, building electrical wiring, conventional telephone lines, T-1 lines, T-3 lines, ISDN lines, ADSL, etc.

The term "wireless transmissions" is used to refer to all types of electromagnetic communications which do not require a wire, cable, or other types of conduits. Examples of wireless transmissions for use in local area networks (LAN) include, but are not limited to, radio frequencies, especially the 900 MHZ and 2.4 GHz bands, infra-red, and laser. Examples of wireless transmissions for use in wide area networks (WAN) include, but are not limited to, narrowband personal communications services (PCS), broadband PCS, circuit switched cellular, and cellular digital packet data (CDPD), etc.

Together, application controllers 18 and application host 22 form a LAN supported by the wire-line and/or wireless transmissions 20. In addition, application controllers 18 can also act as repeaters in case application host 22 cannot directly communicate with a particular application controller 18 while another application controller 18, which does have an established communication link with application host 22, can directly communicate.

Application host 22 acquires data captured by application controllers 18 and can package and communicate that data across an external network 24 using a wide area network (WAN) interface. Application host 22 can be installed together with application controller 18 inside a vending machine or housed separately in another location. In the event that the application host 22 is placed inside a vending machine together with an application controller 18, it is possible to share some of the electronic components between them, the LAN transceiver for example, in order to reduce the cost of the hardware. In this case, the application host 22 and application controller 18 inside the same vending machine, would communicate with each other over a hardwired interface between the two components. Alternatively, the application host 22 and application controller 18 can be designed to be a single integrated component within a vending machine. Furthermore, an application host 22 can be used whose function consists of solely monitoring the application controllers 18. For example, such an application host 22 could take the form of a hand-held portable computer 23 to be carried by service or delivery personnel in order to query the application controllers 18 without having to interact via the WAN interface.

The WAN interface 22 can be implemented in one of a number of ways. In particular, WAN interface 22 is designed to support a wide area network 24 that can be implemented via wire-line or wireless transmissions. If a wireless narrowband PCS paging network is used to implement the WAN, messages from application host 22 can be communicated as digital messages through the pager network and stored in one or more dedicated message mailboxes provided by the wireless network operator. These mailboxes can be securely accessed, for example, through an Internet-based connection.

As shown in FIG. 1, a network operations center (NOC) 26 communicates with one or more vending sites 12 across wide area network 24. As mentioned, in one implementation, network operations center 26 can access mailboxes that store message transmitted by application hosts 22 at vending sites 12. In the embodiment of FIG. 1, network operations center 26 includes a NOC control 28 that communicates with wide area network 24 through a WAN interface 29. NOC control 28 can receive data acquired from and transmit data to vending sites 12, process the data and store the data into a database 30. NOC control 28 can also perform instant alert paging, direct dial alarms and other functions to provide real time notification to a vending operator upon the occurrence of certain events (e.g., out-of-stock, power outage, vandalism, etc.). NOC control 28 can also provide third party transaction processing such as allowing queries on database 30. The WAN interface 29 between NOC control 28 and the wide area network 24 can be implemented through the use of either wire-line or wireless transmissions.

At network operations center 26, a client access point 32 provides access from a client interface subsystem (CI) 34 across external network 24. In one implementation, client access point 32 can be a web-based interface allowing user access from a client computer across a network such as the Internet. Other implementations include providing a direct-dial connection between client interface subsystem 34 and client access point 32. Once connected, a user can use client interface subsystem 34 to obtain information from database 30 based upon data acquired from vending sites 12. Further, users can be provided with extended services such as trend information developed by mining and analyzing database 30.

According to the present invention, system 10 of FIG. 1 combines a number of technologies to provide technical advantages in the area of vending machine management and to overcome existing problems with conventional remote data acquisition systems for vending machines. As mentioned above, some conventional remote data acquisition systems employ a point-to-point wireless communication link to retrieve information from and send information to a plurality of remote devices. Further, wide-area networks (WAN) are often formed from a plurality of local area networks (LANs), and such LANs are often interconnected using a wire-line or wireless data transmission system. In other technical areas, wire-line and wireless transceivers have been used for local area network communication. For example, power line networks are used in a variety of applications such as in the implementation of "smart building" functions, including the systems disclosed in U.S. Pat. Nos. 3,976,264 and 4,763,104. Yet wire-line and wireless LAN communications have generally not been implemented for purposes of data acquisition or vending machine management. In particular, conventional vending machine management systems do not use wire-line and/or wireless transceivers for local interconnection of data acquisition and control devices as does system 10 of FIG. 1.

Figure 2:
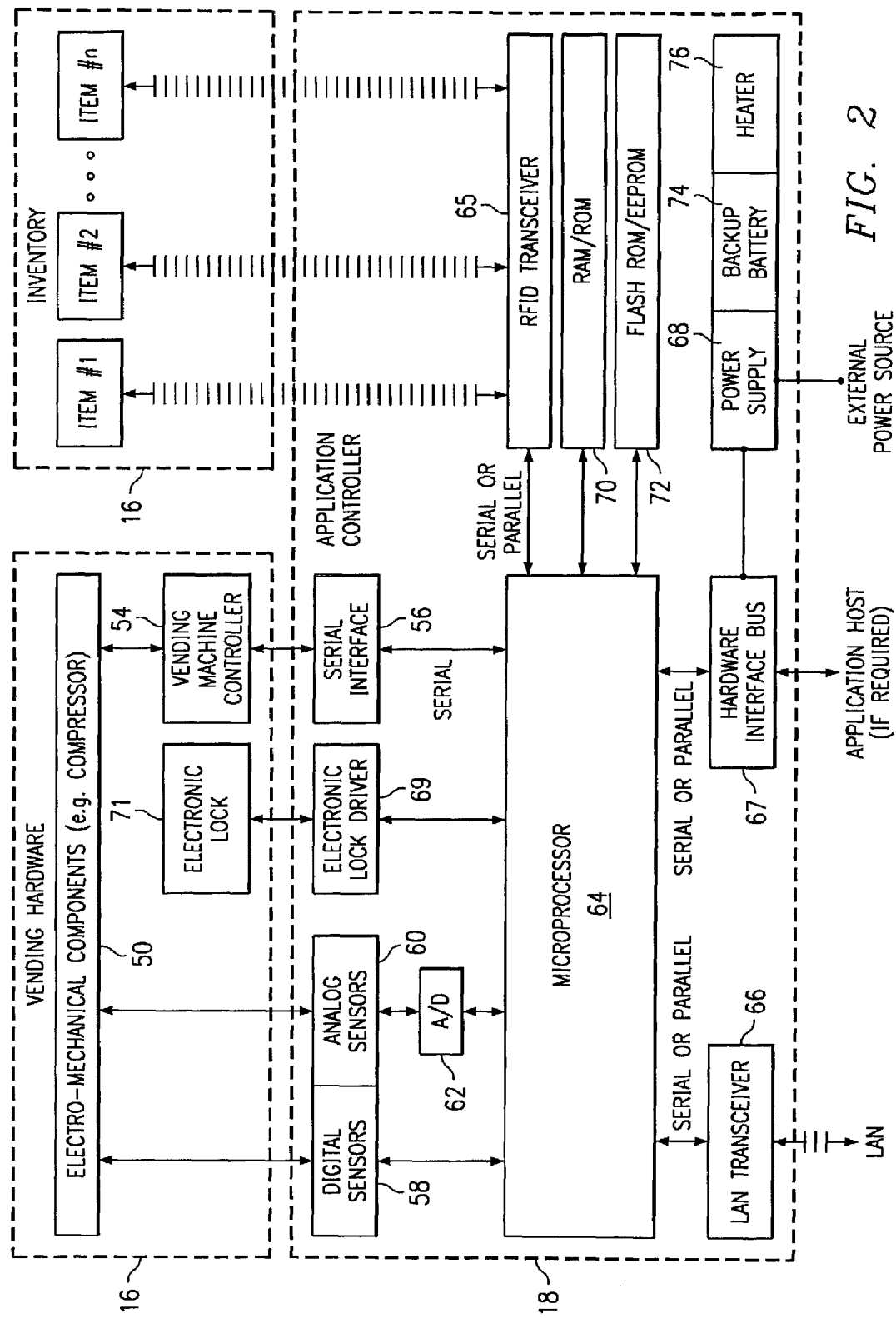
FIG. 2 is a functional block diagram of one embodiment of an application controller and its interface with vending hardware according to the present invention.

FIG. 2 is a functional block diagram of one embodiment of the interface between application controller 18 and vending hardware and inventory 16 according to the present invention. In general, application controller 18 interfaces to the internal systems of vending machine to perform data acquisition and control functions and to provide a wire-line and/or wireless data communication transceiver for establishing a communication link with application host 22 (FIG. 1). As shown, vending hardware 16 can include electro-mechanical components 50, some of which are coupled to and interface with a vending machine controller (VMC) 54.

Application controller 18 interfaces with vending hardware 16. As shown, this interface can include a serial interface 56 (e.g., Multi-Drop Bus or DEX Port) that communicates with VMC 54 using a standard data protocol (e.g. DEX/UCS) implemented by many conventional vending machines. The interface can also include direct sensing of components 50 using digital sensors 58 and analog sensors 60. Analog sensors 60 can be coupled to analog-to-digital (A/D) converters 62 to convert analog measurements to digital signals. A central microprocessor or microcontroller 64 can be coupled to and interface with serial interface 56, digital sensors 58 and A/D converters 62 to acquire data relating to the operation of vending hardware 16. Application controller 18 also can include RFID transceiver device 65 that can directly scan inventory 16 in order to obtain inventory readings. For example, RFID 65 could generate a radio signal that is received by passive transponders attached to inventory items. These transponders can then reply with unique identifiers to the application controller 18 to determine exact inventory levels.

Microprocessor 64 can communicate inventory, event and other data using a wire-line or wireless LAN transceiver 66 that sends the data via wire-line or wireless transmissions respectively. As discussed above, microprocessor 64 can transmit/receive data to/from an application host located at the vending site or to/from a hand-held portable computer acting as an application host. Microprocessor 64 can also communicate with an electronic lock driver 69 which interfaces with an electronic lock 71. In the event that an application controller is collocated with an application host within a vending machine, then the two can communicate using a hardware interface bus 67 which allows the two devices to share electronic components, for example, the LAN transceiver 66.

Further, as shown, application controller 18 may include various types of memory units such as random access and read-only memory (RAM/ROM) 70, FLASH memory and/or Electrically Erasable/Programmable read-only-memory (Flash memory/EEPROM) 72 for storing application code and vending data. The Flash memory can be remotely programmed using the LAN and/or the WAN in the event that its data becomes corrupted or requires upgrade. The present invention is not limited to any specific type of memory unit. Further, application controller 18 may include a power supply 68, a backup battery 74 as well as a heater 76 (if needed).

Figure 3:
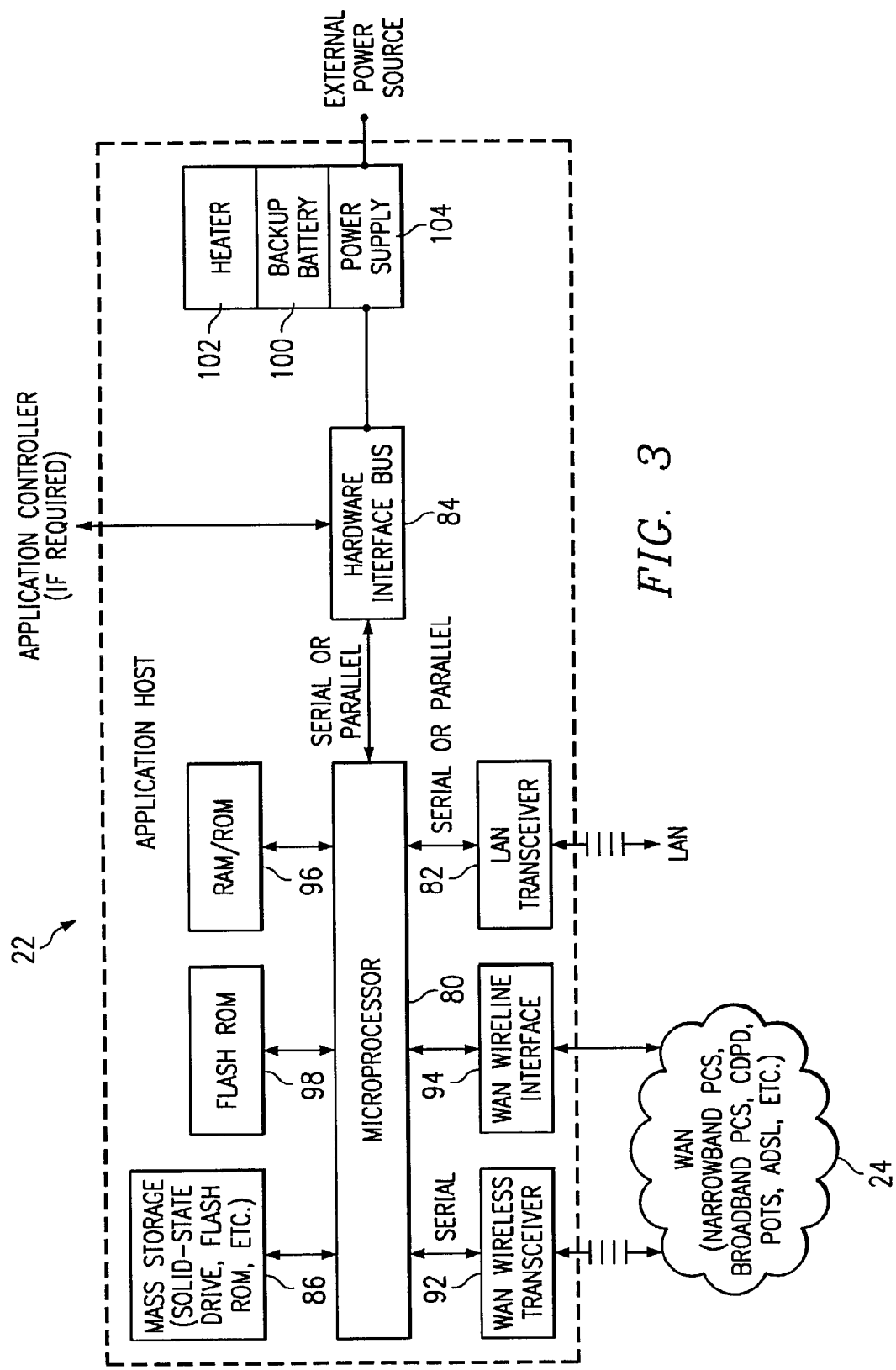
FIG. 3 is a functional block diagram of one embodiment of an application host according to the present invention.

FIG. 3 is a functional block diagram of one embodiment of application host 22 according to the present invention. In general, application host 22 can communicate with application controllers 18 and can communicate externally to establish a link with a remote computer, thus enabling the formation of the WAN. In the embodiment of FIG. 3, application host 22 includes a microprocessor 80 that communicates with application controllers 18 using a LAN transceiver 82. This communication, for example, can involve wire-line and/or wireless transmissions depending upon the operating characteristics of LAN transceiver 82. Application host 22 can also communicate with an application controller 18 using a hardware interface bus 84. For example, this connection can be used in the case where application host 22 is collocated inside a vending machine together with an application controller.

Microprocessor 80 can receive data captured by application controllers 18, process the data and store the data in a mass storage device 86 (e.g., hard drive, solid-state recorder, FLASH memory). Microprocessor 80 can then retrieve data from storage device 86 and communicate data externally using a WAN wireless transceiver 92 or WAN wire-line interface 94 communicating via wireless or wire-line transmissions respectively. In particular, wireless transceiver 92 can be used to implement a digital paging network based communication scheme across a narrowband PCS network as mentioned above. Application host 22 can also include random access and read-only memory (RAM/ROM) 96 and/or FLASH memory 98 for storing application code and vending data. The Flash memory can be remotely programmed using the WAN in the event that its data becomes corrupted or requires upgrade. The present invention is not limited to any specific type of memory unit. Further, application host 22 can include a power supply 104, a back-up power source 100 (e.g., battery) as well as a heater 102 (if needed). Some of the components of application host 22 may be unnecessary if application host 22 and an application controller 18 are interfaced directly inside a vending machine.

Figure 4:
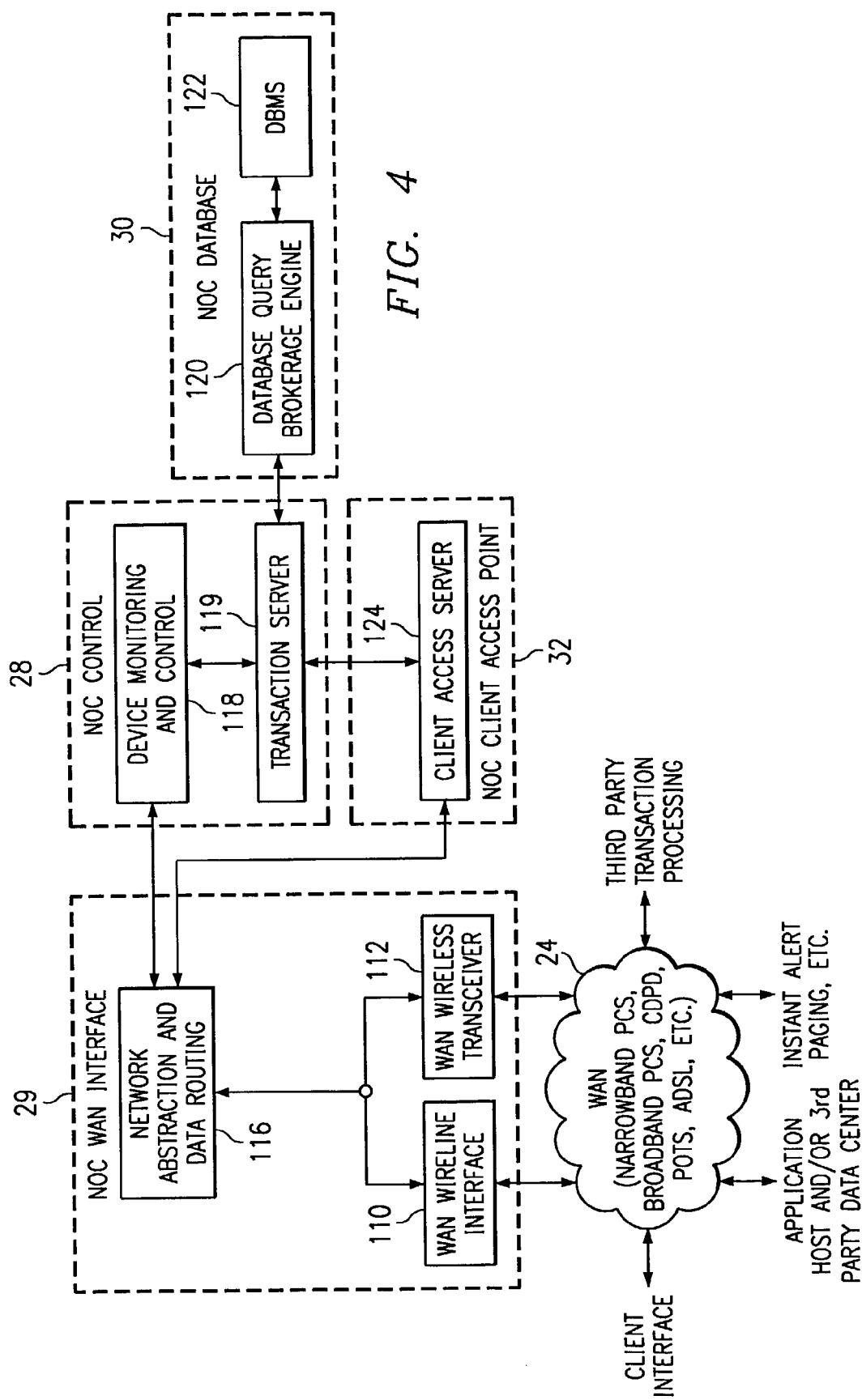
FIG. 4 is a functional block diagram of one embodiment of a network operations center according to the present invention.

FIG. 4 is a functional block diagram of one embodiment of network operations center 26 according to the present invention. As shown, network interface 29 can include various interface devices such as a WAN wire-line interface 110 or WAN wireless transceiver 112 communicating via wire-line or wireless transmissions respectively. These interface devices support connections to external network 24 and communicate internally with a network abstraction and data routing unit 116. Unit 116 can route data to NOC control 28 or client access point 32 as appropriate. NOC control 28 can include one or more device monitoring and control units 118 and transaction servers 119 that have access to a NOC database 30. Database 30 can include a database query brokerage engine 120 connected to a DBMS 122. Client access point 32 can include a client access server 124 that also has access to database 30 through transaction server 119. Transaction servers 119 can operate to receive data acquired from remote vending machines, store and maintain data in database 30, and provide access to database 30. Client access point 32 can operate to support client access to network operations center 26 and database 30.

Figure 5:
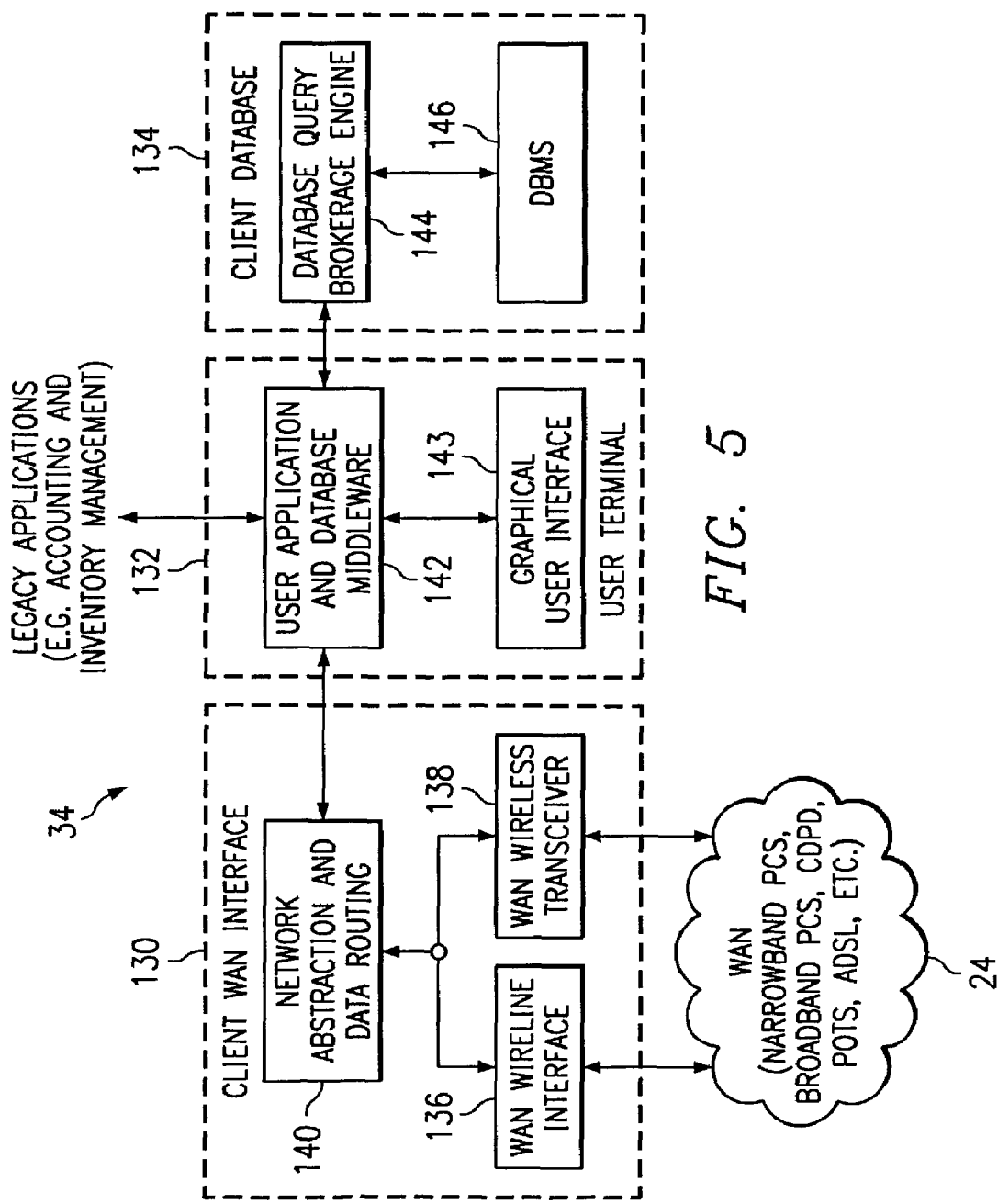
FIG. 5 is a functional block diagram of one embodiment of a client WAN interface according to the present invention.

FIG. 5 is a functional block diagram of one embodiment of the client interface 34 according to the present invention. As shown, client interface 34 can include a WAN interface 130, a user terminal 132 and a database 134. WAN interface 130 can have a number of interface devices for supporting connections to the wide area network 24. These may include a WAN wire-line interface 136 or WAN wireless transceiver 138 communicating via wire-line or wireless transmissions respectively. Network interface 130 is connected to user terminal computer 132 via a network abstraction and data routing unit 140. User terminal 132 can include a user applications and database middleware 142 and a graphical user interface 143. User terminal 132 can also be connected to database 134 which can include a database query brokerage engine software 144 and a database management system (DBMS) 146.

User terminal 132 can provide a local user with a graphical user interface 143 to accomplish a connection to client access point 32 of network operations center 26. Database 134 can locally store information obtained from network operations center 26 regarding the user's vending machine operations. Further, the user applications and database middleware 142 can allow communication with existing legacy applications that the user may have. Further, graphical user interface 143 can be a web browser-type interface. In this case, user terminal 132 could be a computer with a web browser and an Internet connection provided by the network interface 130.

Figure 6:
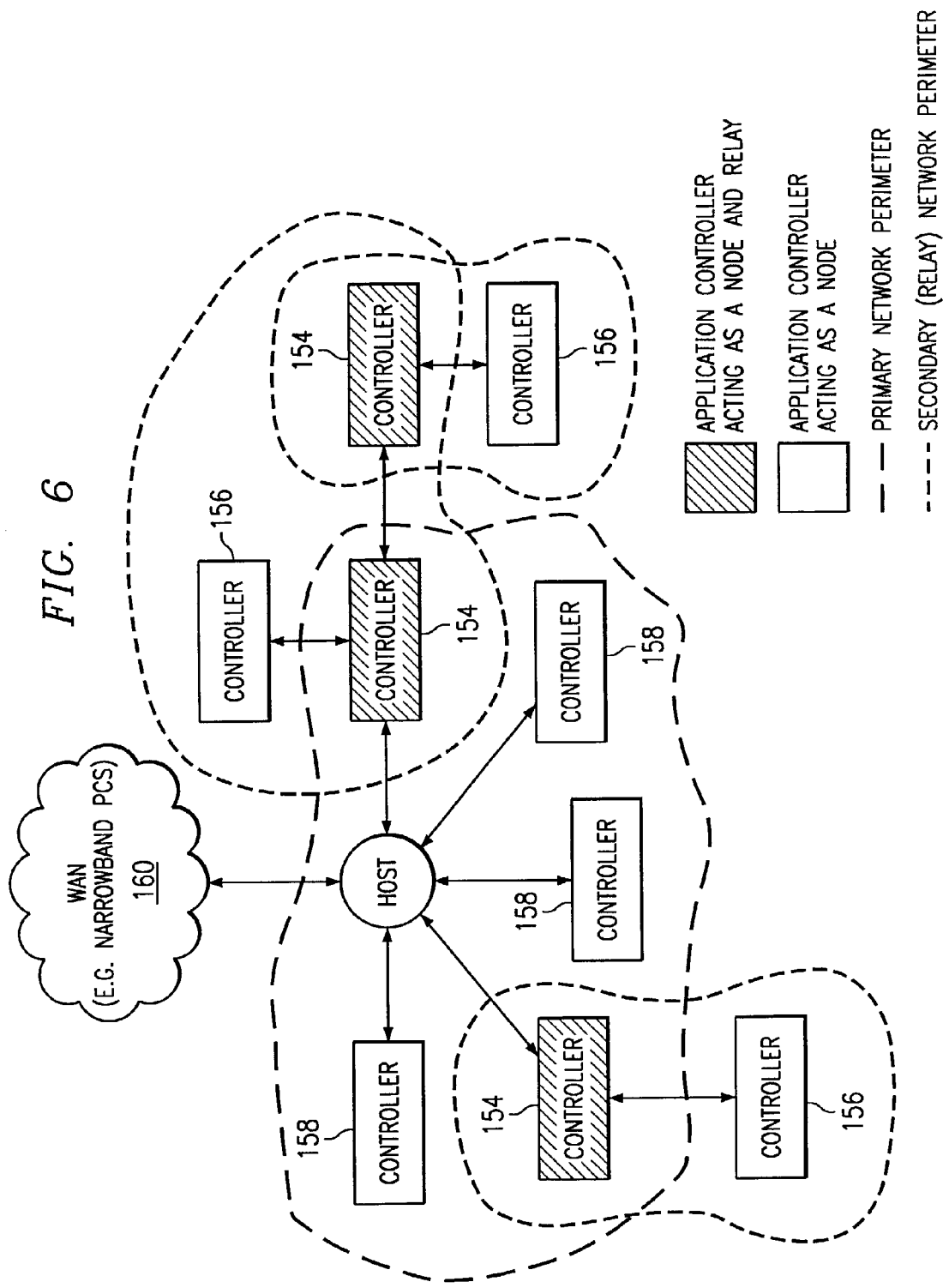
FIG. 6 is a functional block diagram of one embodiment of a wireless local area network implementation architecture according to the present invention.

FIG. 6 is a functional block diagram of one embodiment of a wireless local area network implementation architecture, indicated generally at 150, according to the present invention. In architecture 150, an application host 152 is responsible for creating, maintaining and supervising a LAN on which application controllers 154, 156 and 158 reside. Application host 152 is also responsible for transmitting and receiving information to and from WAN 160. In the illustrated embodiment, WAN 160 is implemented using a two-way narrowband PCS network. It should be understood that other WAN technologies could also be used, including POTS, ADSL, ISDN, wideband PCS, circuit-switched cellular, CDPD, FrameRelay, etc. As shown in FIG. 6, application controllers 154, 156 and 158 can act as a network node or as a network node and a relay.

In FIG. 6, application host 152 operates to route queries directed to application controllers 152, 154 and 158 and stores vending machine data transmitted by application controllers 154, 156 and 158 on the LAN. As in the case of application controllers 154, 156 and 158, application host 152 can sit on either a wire-line (e.g. power line, Ethernet, POTS, etc.) or wireless (e.g. RF or IR) LAN using the appropriate interface and/or transceiver. If application host 152 is incapable of communicating with a specific application controller 154, 156 and 158 because of attenuation and/or noise on the network, application host 152 can request another application controller 154, 156 and 158 to route the data to/from the application controller 154, 156 and 158 which is out of range.

Creation and maintenance of the network by application host 152 can be conducted in any number of ways. One such straightforward approach is discussed below. At activation, application host 152 can transmit a broadcast signal requesting all application controllers 154, 156 and 158 to respond. Application host 152 can then build a table of application controllers 154, 156 and 158 in communication range. Application host 152 can then send a broadcast message requesting that each application controller 154, 156 and 158 in turn transmit a broadcast message requesting a response from all other application controllers 154, 156 and 158 in their communication range so each of the application controllers 154, 156, and 158 can create its own table. The information in these tables will be transmitted to application host 152. Application host 152 will then compare its initial table with all the tables sent in by the individual application controllers 154, 156 and 158. Application host 152 can then identify any application controllers 154, 156 and 158 that are not within its own primary network perimeter (communication range) and will build a routing table for application controllers 154, 156 and 158 not in communication range. This routing information will then be transmitted to each application controller 154, 156 and 158 on a relay (routing)

path. From then on, data being transmitted to an application controller 154, 156 and 158 outside of application host 152's primary network perimeter will contain appropriate routing information, and vice-versa. This type of network does not preclude the possibility of any single application controller 154, 156 and 158 being totally out of network coverage but does provide for a plug-and-play network creation process for those machines within primary and secondary network boundaries. Application controllers 154, 156 and 158 completely out of range may need to be moved to a more suitable location.

One example of multiple relay capabilities provided by the present invention is shown in FIG. 6. By establishing a remote data acquisition and transmission system incorporating teachings of the present invention, there is no architectural limit as to the number of relays that can be implemented between the application host and any particular application controller.

In architecture 150 of FIG. 6, application host 152 can store a copy of the firmware for application controllers 154, 156 and 158 in the event that the copy on an application controller 154, 156 and 158 becomes corrupted or needs to be updated for some reason. As with application controllers 154, 156 and 158, application host 152 can also contain special bootstrap firmware that will allow it to boot up and rewrite the contents of its own firmware. The bootstrap code will signal that application host 152 requires new firmware, and the appropriate software will be sent to it over the WAN interface. This code will then be written to the Flash memory to allow application host 152 to perform the update.

In general, the present invention provides a remote data acquisition system for monitoring and control of vending machines that includes a computer controlled application host located at vending sites. The host can include a wire-line interface or wireless transceiver through which a communication link with a remote computer can be established. The host can also include a wire-line interface and/or wireless transceiver through which the host can communicate with a plurality of vending machines at the vending site. Each vending machine can include a microprocessor controlled set of electronics that performs the actual data acquisition functions from the vending machine and that interfaces with a wire-line interface or wireless communication transceiver for establishing a link to the vending site host computer.

In the above embodiments, an application host controls operations at each vending site. In general, the application host can be implemented by software executing on a computer system that interfaces both to the vending machines on the LAN and the external network. In one embodiment, the software will have a number of software modules or objects that perform the various functions of the application host. The application controllers can also be implemented by executing software which will have a number of software modules or objects that perform the various functions of the application controllers.

Although the present invention has been described in detail, it should be understood that various changes, substitutions and alterations can be made thereto without departing from the spirit and scope of the invention.

What is claimed is:

1. A method for using a wireless hand-held portable computer for vending machine communications, the method comprising:

automatically receiving, at an application controller associated with at least a first vending machine, operation data from the first vending machine;

automatically receiving, at the application controller associated with the at least first vending machine, operation data from a second vending machine;

communicating the operation data from the application controller to the wireless hand-held portable computer;

receiving a query at the application controller from the wireless hand-held portable computer;

in response to the query from the wireless hand-held portable computer, automatically using a wireless interface of the application controller to transmit the operation data for the first vending machine and the second vending machine to the wireless hand-held portable computer;

communicating between the wireless hand-held portable computer and a network operations center using a wide area network (WAN) interface;

transmitting data for the first and second vending machines from the network operations center to the wireless hand-held portable computer via the WAN;

transmitting the data from the wireless hand-held portable computer to the application controller; and communicating the data from the application controller to the first and second vending machines.

2. The method of claim 1, further comprising sending a query from the application controller associated with the first vending machine requesting other vending machines to provide operation data to the application controller associated with the first vending machine.

3. A system for communicating data for vending machines the system comprising:

an application controller interfacing with a vending machine to acquire operation data from the vending machine;

an application host communicating with the application controller via a local area network (LAN) to receive the operation data from the vending machine via the LAN;

a wide area network (WAN) interface in the application host operable to transmit the operation data acquired by the application controller across a digital paging network to a remote transaction server;

a transceiver in the application controller operable to receive the operation data from the vending machine and the transceiver operable to transmit the operation data from the vending machine to the application host;

the remote transaction server communicating with the application host via the digital paging network to receive the operation data acquired by the application controller; and the remote transaction server transmitting data for the vending machine via the digital paging network to the application host;

the application host operable to transmit the data to the application controller via the LAN;

the application controller providing the data to the vending machine; and transmissions from the application host to the remote transaction server including messages transmitted across the digital paging network and stored in one or more dedicated message mailboxes for access by the remote transaction server.

4. A remote data acquisition and transmission system, comprising:

first and second application controllers, the first application controller interfacing with at least a first vending machine to acquire operation data from the first vending machine, and the second application controller interfacing with at least a second vending machine to acquire operation data from the second vending machine;

an application host communicating with at least one of the first and second application controllers via a local area network (LAN) to receive the operation data from the first and second vending machines;

a first transceiver in the first application controller operable to transmit the operation data from the first vending machine to the second application controller;

the first transceiver operable to transmit the operations data from the first machine to the application host;

a second transceiver in the second application controller operable to transmit operation data from the second vending machine to the first application controller;

the second transceiver operable to transmit the operation data from the second machine to the application host;

the first application controller operating as a relay when necessary to establish communication between the application host and the second application controller, such that the first application controller relays the operation data from the second vending machine to the application host on behalf of the second application controller;

the second application controller operating as a relay when necessary to establish communication between the application host and the first application controller, such that the second application controller relays the operation data from the first vending machine to the application host on behalf of the first application controller;

a wide area network (WAN) interface in the application host, wherein the application host uses the WAN interface to transmit the operation data acquired by the first and second application controllers to a remote transaction server;

the application host operable to receive incoming data for the first and second vending machines from the remote transaction server via the WAN;

the application host operable to forward the incoming data to at least one of the first and second application controllers via the LAN; and the first and second application controllers operable to provide the incoming data to the first and second vending machines, respectively.

5. The system of claim 4, wherein the application host and at least one of the application controllers perform operations to autoconfigure the LAN, the operations including configuring the first application controller to operate as a relay for the second application controller when the second application controller is not within a primary communication range of the application host.

6. The system of claim 4, wherein the application host and at least one of the application controllers comprise a wire-line LAN transceiver for communicating via the LAN.

7. The system of claim 4, wherein the application host and at least one of the application controllers comprise wireless LAN transceivers for communicating via the LAN.

8. The system of claim 4, wherein the application host comprises a portable computer.

9. The system of claim 4, wherein the wide area network interface of the application host comprises a WAN wire-line interface.

10. The system of claim 4, wherein the WAN interface of the application host comprises a WAN wireless transceiver.

11. The system of claim 4, wherein the WAN interface of the application host connects the LAN with the remote transaction server via a narrowband PCS wireless link.

12. The system of claim 4, wherein:
at least one of the first and second machines comprises a vending machine; and
at least one of the application controllers interfaces with at least one of the vending machines via a serial interface to a vending machine controller.

13. The system of claim 4, wherein:
at least one of the first and second machines comprises a vending machine; and
at least one of the application controllers interfaces with at least one of the vending machines via a vending machine multi-drop bus.

14. The system of claim 4, further comprising:
the operation data acquired from at least one of the first and second vending machines comprises product dispensing and inventory data.

15. The system of claim 4, wherein the operation data acquired from the first and second vending machines comprises equipment status data.

16. The system of claim 4, further comprising:
a database in the remote transaction server, used to store the operation data; and
a software module in the remote transaction server that provides secure third party access to the database via a web browser to connect to the remote transaction server across an internet based network.

17. The system of claim 4, further comprising:
a second LAN in communication with the remote transaction server; and
the second LAN containing third and fourth application controllers and a second application host communicating with at least one of the third and fourth application controllers, wherein the application hosts in the at least one LAN and the second LAN use a wireless two way paging network to connect with the remote transaction server, to establish an efficient and low cost wide area network.

18. The method of claim 2, wherein sending the query further comprises broadcasting the query.

* * * * *